United States Patent [19]

Bleckmann

[11] 4,106,179
[45] Aug. 15, 1978

[54] METHOD OF COLD-JOINING METAL PARTS

[76] Inventor: Richard Bleckmann, Imbergstrasse 24, Salzburg, Austria

[21] Appl. No.: 728,060

[22] Filed: Sep. 30, 1976

Related U.S. Application Data

[63] Continuation-in-part of Ser. No. 487,633, Jul. 11, 1974, Pat. No. 4,008,845.

[30] Foreign Application Priority Data

Jul. 16, 1973 [DE] Fed. Rep. of Germany ....... 2336149

[51] Int. Cl.² .............................................. B23P 11/00
[52] U.S. Cl. ........................................ 29/432; 29/521; 29/611; 403/405
[58] Field of Search ................. 29/611, 509, 521, 432, 29/432.1, 432.2; 228/136, 138, 139; 403/405, 406; 428/223; 219/438, 439, 441, 442, 430, 462, 443, 463, 530, 540

[56] References Cited

U.S. PATENT DOCUMENTS

| | | | |
|---|---|---|---|
| 3,279,972 | 10/1966 | Thassy | 428/223 |
| 3,314,325 | 4/1967 | Zahodiakin | 29/432 X |
| 3,341,932 | 9/1967 | Haller | 29/432 |
| 3,376,060 | 4/1968 | Tomioka | 403/300 |
| 3,392,439 | 7/1968 | Sonnenschein | 29/573 |
| 3,436,816 | 4/1969 | Lemelson | 29/611 |
| 3,700,514 | 10/1972 | Zito, Jr. | 156/298 X |
| 3,761,007 | 9/1973 | Richter | 228/2.5 |
| 3,828,515 | 8/1974 | Galgoczy et al. | 29/526 X |
| 4,008,845 | 2/1977 | Bleckmann | 29/521 X |

*Primary Examiner*—Victor A. DiPalma
*Attorney, Agent, or Firm*—Fleit & Jacobson

[57] ABSTRACT

A method of joining together two metal parts, one of which may be a tubular heater, wherein an insert such as a helical wire coil which is preferably provided with a core is positioned between the parts or around one of the parts and the parts pressed together into abutting engagement so that the insert is embedded in both of the parts to retain the parts together in a securely bonded relationship.

24 Claims, 32 Drawing Figures

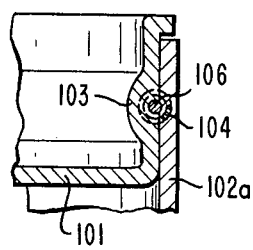
FIG. 30
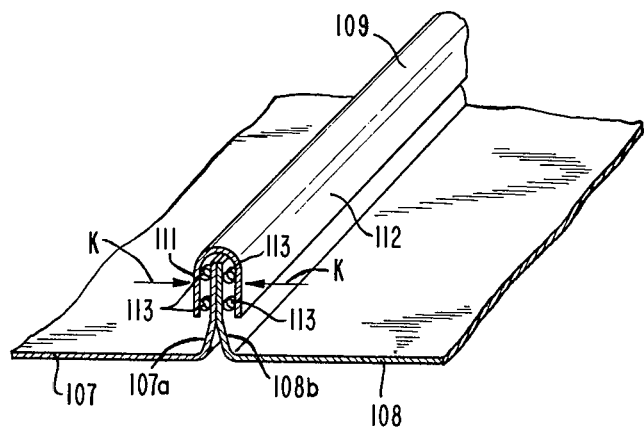
FIG. 31
FIG. 32
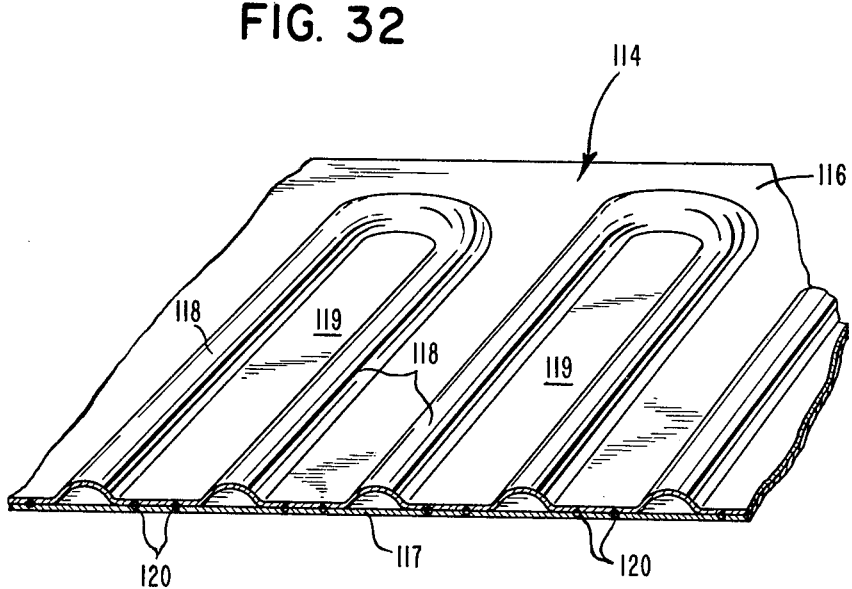

METHOD OF COLD-JOINING METAL PARTS

This application is a continuation-in-part of U.S. patent application Ser. No. 487,633, now U.S. Pat. No. 4,008,845, entitled Method of Positive and Non-Positive Cold-Joining filed July 11, 1974 by the applicant herein.

BACKGROUND OF THE INVENTION

It is known to press parts of metal or plastic together by providing recesses or protuberances on the parts like the tongue and groove principle and pressing the protuberances into the recesses. In addition, it is also known from German Pat. No. 455,259, for example, to furnish the parts being joined together with thread-shaped or conical bore holes, a cylindrical pin being inserted into the respectively coinciding holes.

These methods are disadvantageous to the extent that the surfaces being connected have to be shaped or machined in a certain manner. This leads to considerable expense, especially for mass production, with the result that other methods of joining metal parts such as soldering are preferable. In German document No. 2,264,142, laid open for inspection, the disadvantages and difficulties of the known methods are discussed in the introduction and present a good survey of the present state of the art in the field of composite metals. For the purpose of solving the problems, this publication suggests that the surface of an iron plate be furnished with a multiplicity of indentations of suitable width and depth. Aluminum material is then sprayed into these indentations. The latter are produced mechanically, for example, by means of a tilted cutting tool which is a very expensive process.

German Pat. No. 519,945 suggests a method for the mechanical joining of two metal sheets which lie on each other and have different degrees of hardness. The harder of the two has indentations into which some of the softer sheet flows when the metal sheets are pressed together. This patent specification suggests that the indentations be tooth-shaped. However, this means that the harder sheet has to be again treated in a certain way.

U.S. Pat. No. 3,485,518 teaches the use of metal joining strips by means of which wood boards can be joined together in flush engagement (column 4, line 34). The joining strips have nail-shaped teeth with which they penetrate the surface of the wood. This is a type of nailing with nail strips.

All the methods described so far also have the disadvantage that the parts to be joined together must have a certain minimum thickness - on the one hand, so that the necessary indentations can be worked into the surface, or on the other hand so that the nail strips or joining pins, for example, can penetrate far enough. Consequently, the known methods cannot be employed as a practical matter for the joining of relatively thin sheets of metal.

A method for the cold welding of two pieces of metal is disclosed by Swiss Pat. No. 383,730. By the "cold welding" of two pieces of metal, we mean methods which are carried out at very great pressure and used generally to join different kinds of metal, for example, aluminum and copper and alloys of these metals. Roughening and thorough degreasing of the metal surfaces which are to be joined together are essential for cold welding. The method described in the aforementioned Swiss specification permits the elimination of the "scratching" or "brushing" of the metal surfaces to be joined. To this end, a third piece is placed between the two pieces which are to be welded together and during the pressing process, such third piece exerts a roughening, scrubbing or tearing action on the surfaces of the metal pieces being joined together so that cold welding takes place at the scratched, scrubbed or torn surfaces.

Prior art cold welding processes also include the socalled "explosive plating" techniques. In these techniques two metal plates are held apart a selected distance such as, for example 0.4 mm, by means of spacers. An explosive is applied to the upper plate and ignited. The upper plate is thrown against the lower one by the force of the explosion so that the metal plates are thereby joined. This method is expensive because bunker-like buildings are required for the purpose of protection. Also, the quantity of explosives required is considerable.

SUMMARY OF THE INVENTION

This invention is directed to a method of cold-joining metal parts in which the surfaces of the parts being joined and not the parts themselves are joined together. To this extent, the method of the invention is not a cold welding process and pretreatment of the metal surfaces is accordingly not necessary. In the method of the invention, an insert of appropriate cross-sectional shape is placed between the metal parts which are to be joined together and the parts compressed together so that the material of at least one of the parts flows around the insert and the metal parts are anchored together through the insert with the insert sandwiched between the parts which are securely bonded together with their adjacent surfaces in abutting engagement. The insert may be of any suitable shape such as a wire or wire coil and in one embodiment may be in the form of a wire coil which is wrapped around one of the parts to be joined.

Accordingly, a primary object of this invention is to provide a new and novel method of cold-joining metal parts together.

Another object of this invention is to provide a new and novel method of cold-joining metal parts having smooth surfaces together which may be used to join together relatively thin metal sheets.

A further object of this invention is to provide a new and novel method of cold-joining metal parts together in which the surfaces of the parts to be joined do not require pre-treatment such as machining or degreasing and which permits the formation of a cold-joint between the parts at a relatively low working pressure.

Still another object of this invention is to provide a new and novel method of cold-joining metal parts together which not only may be utilized to join two metal plates together but which also may be utilized to bond a tubular heater to an appliance such as flat-iron, tea kettle, frying pan or the like.

This invention further contemplates the provision of a new and novel method of cold-joining metal parts together which may be carried out in a simple and easy manner, which may be utilized to join together metal parts in a wide range of thicknesses and types, which provides a cold-joint which is uneffected by the application of heat and which utilizes a minimum of inexpensive parts for an unlimited variety of applications where metal parts are to be joined.

In the practice of the method of the invention, two metal parts to be joined are provided together with at least one insert which is formed of a metal material having a hardness greater than the hardness of the metal material of at least one, preferably both, of the parts to be joined. The metal parts, with the insert therebetween, are moved towards each other by the application of a working pressure so that the insert penetrates into the material of at least one of the parts being enclosed by the material of the parts and the insert is anchored within one or both of the two parts with parts secured together permanently in abutting relationship. The insert may be of any selected shape such as a wire, a rod, wire coil or metal stampings or the like and when the insert is in the form of a wire coil, the coil is preferably provided with a core and the wire coil preferably has a pitch which is matched to the material of the parts being joined and to the material of the wire coil.

In one embodiment, although the metal parts to be joined may be in plate or sheet form, the method of the invention is very adaptable for securing moldings to a plate. For example, the method of the invention may be used to attach an electric tubular heating element to a container wall or the bottom of a cooking vessel. When one of the parts to be joined comprises a tubular heater, the insert is preferably in the form of a wire coil which is wrapped in a helical fashion around the tubular heater in longitudinally extending relationship therewith.

DESCRIPTION OF THE DRAWINGS

Further features of the invention are described below with reference to the attached drawings.

FIG. 30 is an enlarged sectional view of that portion of the can of FIG. 29 shown in the circle;

FIG. 31 is a perspective view partially in section of a portion of a roof seal formed in accordance with another embodiment of the invention; and FIG. 32 is a perspective view partially in section of a portion of a pipe system formed in accordance with another embodiment of the invention.

DESCRIPTION OF THE PREFERRED EMBODIMENTS

Figure 1:
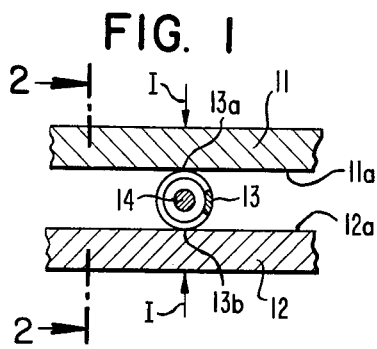
FIG. 1 is an elevation view partially in section of the arrangement of the metal parts which are to be joined together in one embodiment of the invention during an initial step in the practice of the method of the invention.
Figure 2:
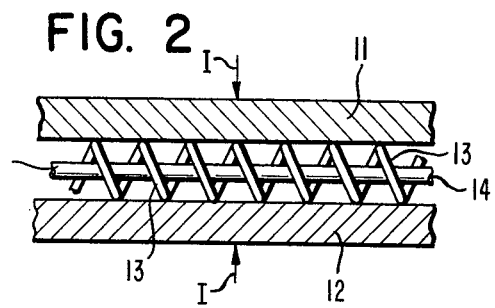
FIG. 2 is a sectional view taken substantially along line 2—2 of FIG. 1 in the direction of the arrows.
Figure 3:
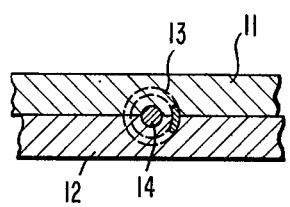
FIG. 3 is a view similar to FIG. 1 showing the final condition of the parts joined by the method of the invention.

Referring now to the drawings and to FIGS. 1-3 specifically, there is shown one embodiment of the method of the invention for joining together two metal parts, such as metal sheets 11, 12 having contact surfaces 11a, 12a. Sheets 11, 12 may be composed of any suitable materials, such as aluminum or the like and, as will be explained hereinafter, may form a component part of a shaped article, such as a vessel, electrical appliance or the like.

The method of the invention including a provision of a metal insert of any suitable shape, such as a stamping, rod, etc. and in the illustrated embodiment of FIGS. 1-3 comprises a coil of wire 13. The insert or coil 13 is formed of a selected metal, such as copper or the like, the material of which, together with the thickness of the coil and its pitch, is predetermined in accordance with the metal material of the metal parts 11, 12. Furthermore, the hardness of the metal from which the coil 13 is formed is greater than the hardness at least one of the parts 11, 12, preferably harder than both of the metal parts.

The coil 13 is also preferably provided with a longitudinally extending core member 14 which may be in the form of a rod formed of suitable material such as an AlMg alloy which is disposed centrally within the coil 13 as shown best in FIG. 2. Not only does the core member 14 improve the resulting joint formed by the method of the invention but it permits the coil 13 to be more easily handled since it is relatively flexible.

In the operation of the embodiment of FIGS. 1-3, the coil 13, provided with rod 14, is positioned between the parts 11, 12 to be joined oppositely disposed portions 13a, 13b of the coil 13 in engagement with the contact surfaces 11a, 12a on the parts 11, 12 respectively. The parts 11, 12 are then moved together in the direction of the arrows I to compress the coil 13 between the parts 11, 12 whereby the material of the parts 11, 12 flows around the coil portions 13a, 13b embedding the coil within the parts 11, 12 as the contact surfaces 11a, 12a are brought into abutting engagement as shown in FIG. 3. Thus, the insert or coil 13 anchors the two parts 11, 12 together in a securely bonded cold-joined relationship.

It should be understood that the metal material of coil 13, the thickness and pitch of the wire being matched to the metal of the parts 11, 12 may be easily determined by suitable testing procedures, it being understood that the coil 13 must not be pressed flat between the parts in order to accomplish the novel results of the invention. By way of example, the novel results of the invention were obtained wherein the metal parts 11, 12 were formed of aluminum having a thickness of 1.5 mm, the material of the coil 13 being copper wire resistant to drawing having a wire thickness of 0.6 mm diameter and a pitch of 2 mm.

Figure 4:
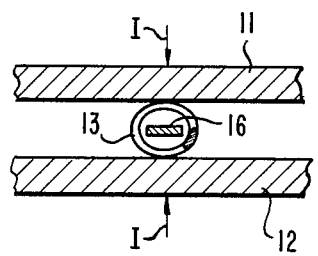
FIG. 4 is an elevation view similar to FIG. 1 showing the use of a modified insert in the practice of the invention.
Figure 5:
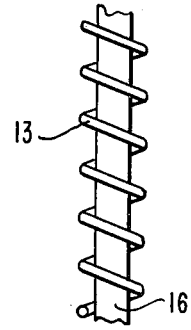
FIG. 5 is a plan view of the insert used in the embodiment of FIG. 4.

As shown in FIGS. 4, 5, the core member employed with the coil 13 may be in the form of a substantially flat metal strip 16 and the rod 14 or strip 16 may be either inserted into the coil 13 or the coil 13 may be wound around the rod 14 or strip 16. Furthermore, the rod 14 or strip 16 may be bent into the desired configuration in accordance with the size and shape of the metal parts to be joined. This enables metal parts having irregular contact surfaces to be joined together.

Figure 6:
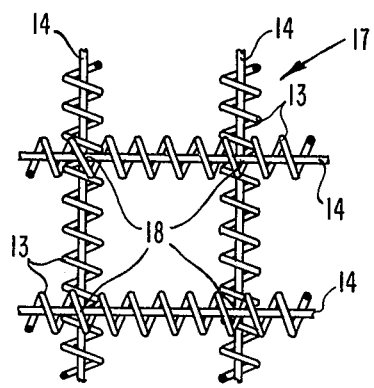
FIG. 6 is a plan view of another insert used in the practice of the invention.

While in the embodiments of FIGS. 1-5, only a single coil is shown if larger metal parts such as larger metal sheets are to be joined together, a plurality of such coils may be utilized, the number and spacing of such coils being selected in accordance with the strength required in the joint between the parts 11, 12. For instance, use may be made of a plurality of individual coils or a continuous coil may be used having a configuration so that a secure joint is formed throughout the entire area of the contact surfaces of the parts to be joined. Furthermore, it is preferable to utilize a press when smaller parts are to be joined and larger parts such as large metal sheets are preferably joined with the method of the invention by passing the metal parts or sheets through work rolls with continuous coils extending between the parts and with a suitable spacing therebetween for example, a spacing of 5 cm or the like. It should be understood that when the joint is formed with the method of the invention as shown in FIG. 3, it is not possible to determine from the exterior of the joined parts, the manner in which they are joined together.

Where the metal parts 11, 12 are of substantial size, it is within the scope of the invention to provide an arrangement of the coils 13 in the form of a grid designated generally in FIG. 6 by the numeral 17. As shown in FIG. 6, the coil 13, each of which is preferably provided with a core member or rod 14, is arranged in a plurality of intersecting sections with the core members or rods 14 joined together at joints 18 by suitable means such as spot welding or the like. With such a grid 17, the insert acquires a degree of rigidity which permits the insert to be readily handled in the formation of the joint using the method of the invention.

Figure 7:
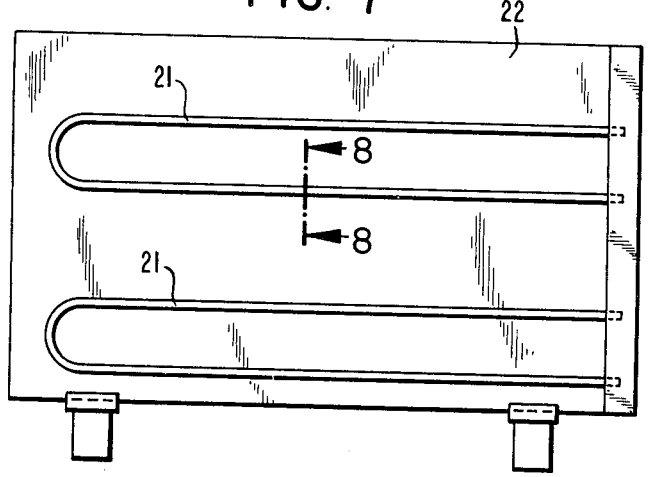
FIG. 7 is an elevation view of a radiator for room heating purposes formed using the method of the invention.
Figure 8:
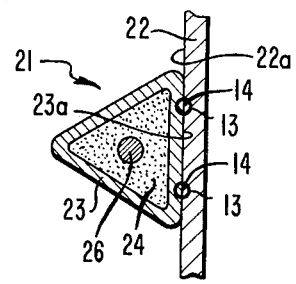
FIG. 8 is an enlarged sectional view taken substantially along line 8—8 of FIG. 7 in the direction of the arrows.

Referring now to FIGS. 7, 8, there is shown a further embodiment of the invention wherein one of the metal parts comprises a tubular heater 21, the other metal part being a sheet or plate 22 as shown best in FIG. 8. The tubular heater 21 is a conventional type of electrical heating device comprising an outer tubular jacket 23 of aluminum or the like having an interior filled with insulating material 24 such as magnesium oxide (MgO) in which is embedded a heating coil or electrical conductor 26. One or more inserts which may be in the form of a coil 13 having a core member 14 are utilized between a contact member surface 23a of the tubular heater 21 and the contact surface 22a of metal sheet 22. The tubular heater 21 and metal sheet 22 are pressed together with the inserts 13 therebetween to form a joint between the two metal parts as described above with reference to the embodiment of FIGS. 1-3. The material of the insert or coil 13 is harder than that of both the tubular heater jacket 23 and metal sheet 22 so that the coil 13 is embedded in both of the parts with the contact surfaces 22a, 23a in abutting engagement as shown in FIG. 8.

The arrangement of FIG. 8 may also be utilized to join a tubular heater 21 of any selected configuration to metal parts and for a variety of purposes. As shown in FIG. 7, a pair of tubular heaters 21 are provided, each of the heaters being arranged in a U-shaped configuration and disposed in spaced relationship, the heaters 21 being secured in the manner shown in FIG. 8 to a metal panel 22 to thereby form a space-type heating appliance of a well-known type for heating spaces such as rooms in a building or the like.

Figure 9:
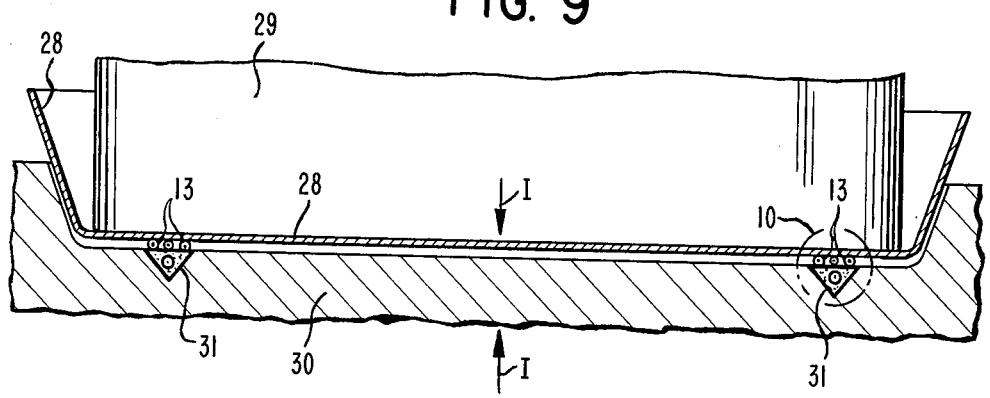
FIG. 9 is a sectional view of apparatus for joining a tubular heating element to a frying pan in accordance with the method of the invention.
Figure 10:
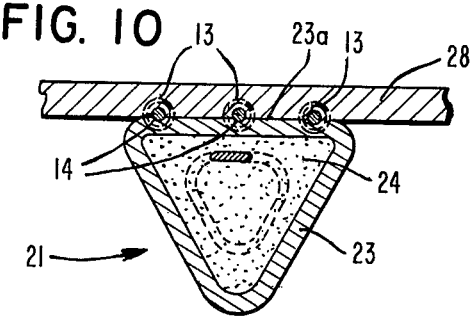
FIG. 10 is an enlarged sectional view of the portion of FIG. 9 enclosed in the circle.

FIGS. 9, 10 illustrate an embodiment of the invention wherein one or more tubular heaters 21 are attached in the manner shown in FIG. 10 which may be the metal bottom wall 28 of a cooking vessel 29 such as a pot or the like. As explained above, both the jacket 23 of the tubular heater 21 and the bottom 28 of the vessel 29 are formed of a material softer than that of the inserts such as wire coils 13 having core members 14, aluminum being a typical metal for both of these metal parts, so that the coils 13 are embedded in both the vessel bottom wall 28 and heater jacket 23.

As shown best in FIG. 9, a plurality of such heaters 21 are secured to the vessel bottom wall 28 utilizing a plurality of inserts or coils 13. Furthermore, tubular heaters 21 of conventional construction are usually circular or oval shaped in cross-section and preferably during the compressing step of the invention, a die 30 is employed having recesses 31 of a selected configuration in which the tubular heaters 21 are disposed prior to compressing the heater 21 and vessel bottom wall 28 together. Thus, when the die 30 and vessel bottom wall 28 are moved together in the direction of the arrows I to embed the insert or coils 13 within the two metal parts, the tubular heaters 21 are compressed into the configuration of the die cavity 31 which, in the illustrated embodiment, may be of triangular cross-sectional shape. Such a triangular cross-sectional shape is preferred in that the contact surface 23a of the tubular heater is increased so that the transmission of heat to the vessel bottom wall 28 is improved and a broader anchoring surface between the metal parts is obtained. Furthermore, the insulating material 24 of the tubular heater 21 is compressed to its optimum density which permits the elimination of the conventional pressing of such tubular heating elements 21 between rolls.

Furthermore, referring now again to FIGS. 7, 8, the arrangement of the two hairpin-shaped tubular heating elements 21 on the large metal panel 22 provide for excellent heat transmission from the heaters 21 to the plate 22 and the large surface of the plate 22 with attendant excellent transmission of heat to the air in the room in which the panel 22 is located, produces ideal heating characteristics. Since the temperature of the tubular heaters 21 is relatively low and as the insulating material 24 used in the tubular heaters 21 is compressed to its optimum value, the heaters 21 will have a long service life.

Although electrically powered tubular heaters are popular, in another arrangement, instead of joining an electric tubular heater and an aluminum plate together, a hollow pipe may be joined to the aluminum plate and steam or hot water passed through the pipe. In this manner, a space heater for use with a central steam or hot water heating system is provided. In other words, any type of tubular heater which may be available is suitable for use with the method of the present invention.

Figure 11:
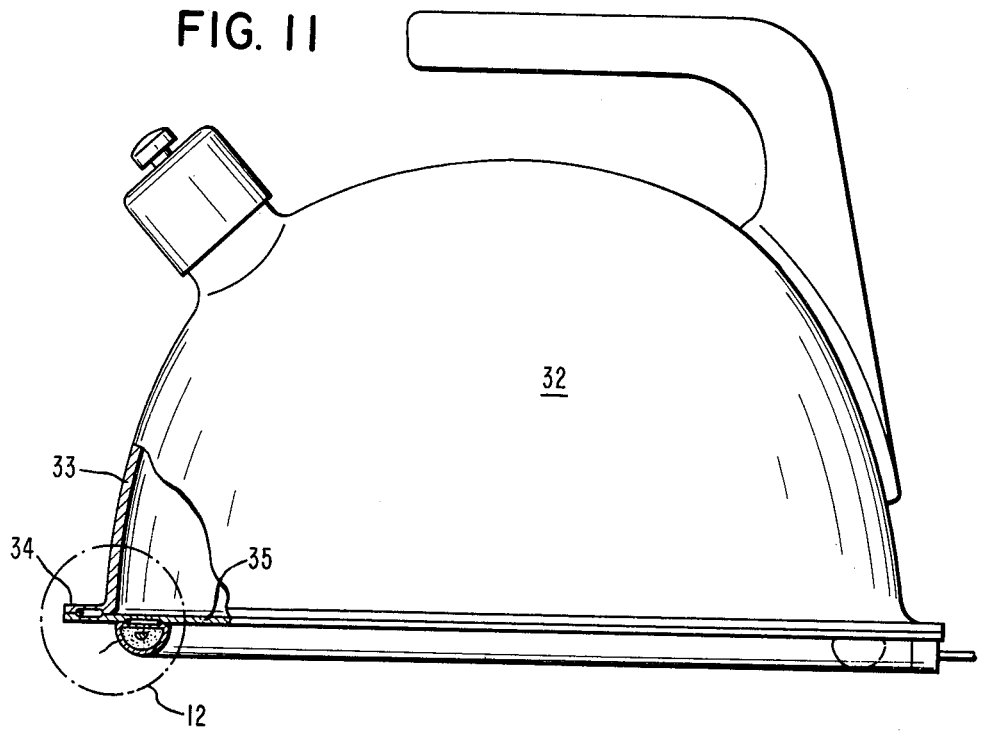
FIG. 11 is an elevation view partially in section of a water kettle having a portion formed in accordance with the method of the invention.
Figure 12:
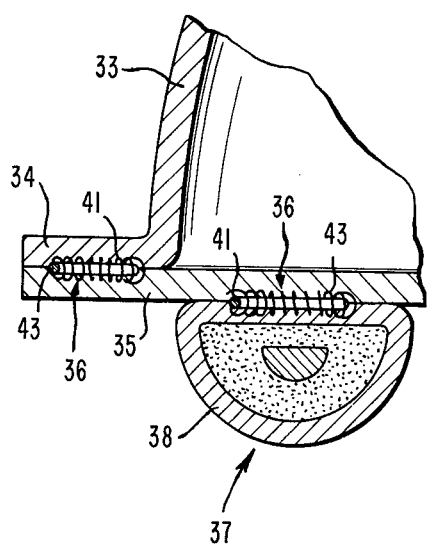
FIG. 12 is an enlarged sectional view of that portion of FIG. 11 shown in the circle.
Figure 13:
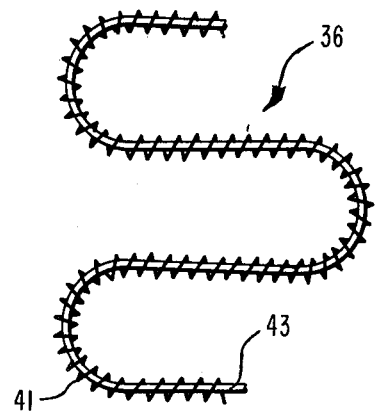
FIG. 13 is a plan view of the insert utilized in the embodiment of FIG. 11.

Referring now to FIGS. 11—13, there is shown an electrically heated water kettle 32, the heating component of which is produced in accordance with the method of the invention. The kettle 32, as shown in FIG. 11, includes a body 33 having an outwardly extending marginal flange 34 along its bottom edge to which is attached the marginal edge portion of a metal plate 35 by the novel method of the invention using an insert 36 to form a bottom wall for the kettle 32. A tubular heater 37 of a type similar to the tubular heater shown in FIG. 8 having a jacket 38 is also attached to the plate 34 by means of an insert 36. The inserts each comprise a wire coil having core members respectively, each of which is preferably of undulating shape as shown in FIG. 13.

As discussed above, the bottom plate 35 and flange 34 are pressed together with the insert 36 therebetween in accordance with the method of the invention. The tubular heater 37 is similarly joined to the plate 35 by means of a pressing operation with the insert 36, the tubular heater 37 being preferably shaped by a die having a suitable shaped cavity as discussed above with reference to FIG. 9.

Figure 14:
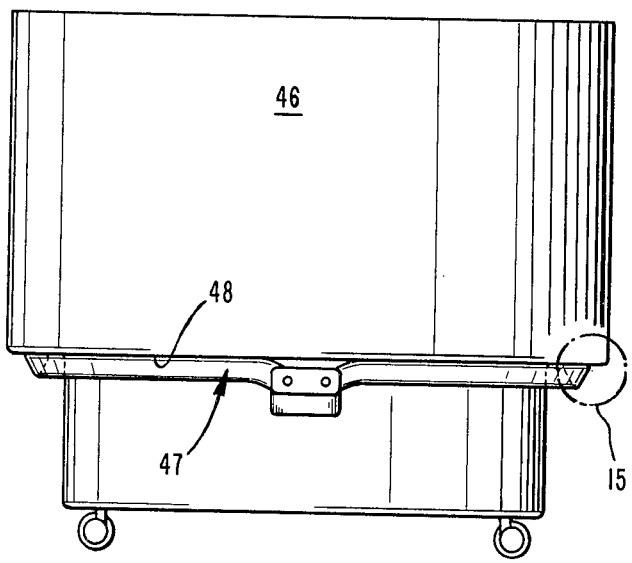
FIG. 14 is an elevation view of a frying appliance having a portion formed in accordance with the method of the invention.
Figure 15:
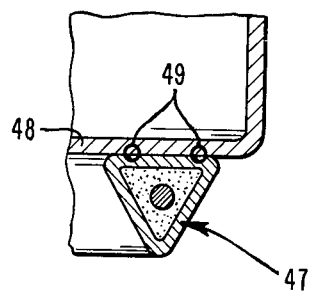
FIG. 15 is an enlarged sectional view of that portion of FIG. 14 shown in the circle.

Another appliance to which the method of the invention is adapted is shown in FIG. 14 wherein there is shown a fritteuse or fryer 46, a tubular heater 47 of circular configuration being joined to the bottom wall 48 of the fryer 46 by means of coil inserts 49 using the method of the invention as shown best in FIG. 15.

Figure 16:
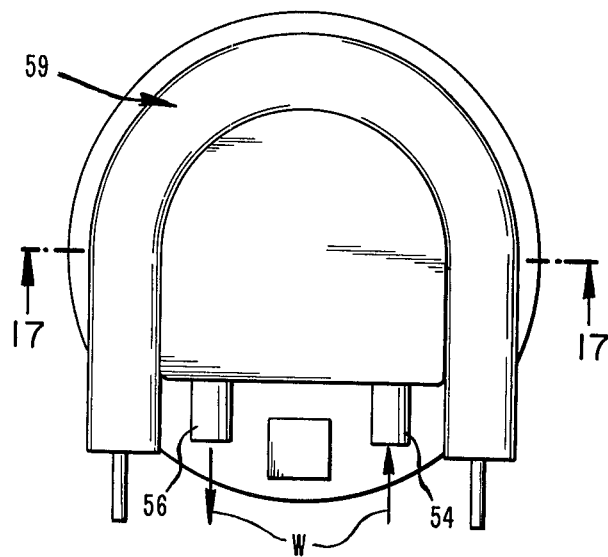
FIG. 16 is a bottom view of the hot-plate of a coffee percolator having a portion formed in accordance with the method of the invention.
Figure 17:
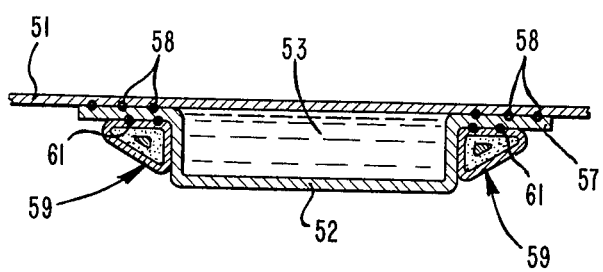
FIG. 17 shows a sectional view taken substantially along line 17—17 of FIG. 16 in the direction of the arrows.

In the embodiment of FIGS. 16, 17, the method of the invention is used in the manufacture of the hot-plate for a coffee percolator or the like, only a portion or lid 51 of which is shown in the drawings. As shown in FIGS. 16, 17, a bowl-shaped bottom part 52 of aluminum or the like arranged to contain water 53 is provided with connections 54, 56 for supplying water as indicated by the arrows W. The part 52 is provided with an annular flange 57 which is pressed on to the underside of the lid 51 using inserts 58 such as wire coils in accordance with the method of the invention. A tubular heater 59 of the type previously described, is similarly attached to the underside of the flange 57 using inserts 61 in accordance with the method of the invention, the tubular heater 59, flange 57 and lid 51 being preferably joined together using the method of the invention in a single operation.

Referring now to FIGS. 19-22, there is shown another embodiment of the method of the invention for attaching a tubular heater 61 to a metal part such as sheet or plate 62. The tubular heater 61 may be similar to the tubular heater 21 of FIG. 8 and the metal sheet or plates 62 may be a component part of any selected apparatus such as the bottom of a frying pan, the wall of a container or a panel for the radiation of heat. In the embodiment of FIGS. 19-22, an insert in the form of a wire coil 63 is wrapped around the tubular heater 61 in overlying engagement with the jacket 64 of the heater and with the coil extending longitudinally along substantially the entire length of the heater 61. Of course, since pre-formed wire coils are so readily available, instead of wrapping the wire coil 63 around a tubular heater 61, an appropriately sized coil may simply be slipped over the heater. Similarly, since such commercially available wire coils are so flexible, the tubular heater 61 may be first bent or formed into the desired shape and then the wire coil 63 may be slipped over the end and slid into position.

Figure 20:
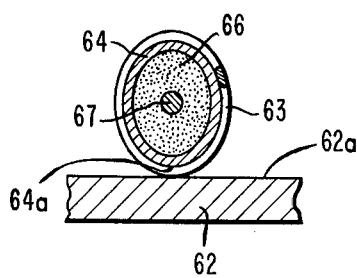
FIG. 20 is a sectional view of the parts of the embodiment of FIG. 19 at an intermediate stage in the practice of the invention.

As previously discussed, the heater 61 is initially of oval cross-sectional shape as shown in FIG. 20 and includes an outer jacket 64 having in its interior a core member 67 embedded in the insulating material 66. The insert or wire coil 63 preferably has a hardness greater than that of the metal of plate 62.

Figure 21:
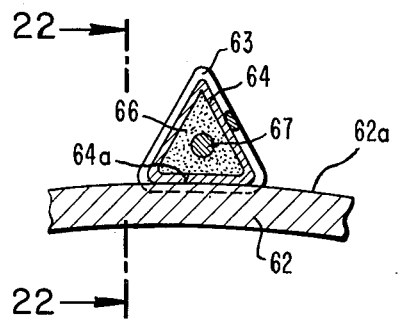
FIG. 21 is a view similar to FIG. 20 showing the condition of the parts after the final stage in the practice of the method of the invention.
Figure 22:
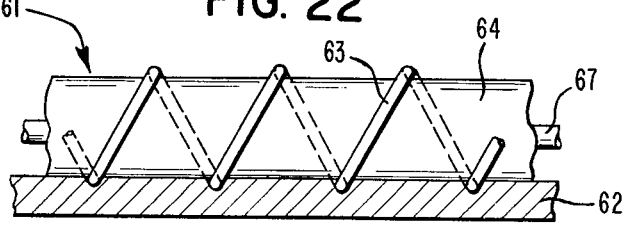
FIG. 22 is a sectional view taken substantially along line 22—22 of FIG. 21 in the direction of the arrows.

The tubular heater 61 together with the wire coil 63 is then pressed into the contact surface 62a of the plate 62 so that the wire 63 is embedded in the plate 62 anchoring the heater 61 to the plate 62 with the jacket portion 64a in abutting engagement with the contact surface 62a of the plate 62 as shown in FIG. 21. Preferably, a die having a suitable shaped cavity is utilized during the pressing operation in accordance with the method of the invention so that the heater 61 is changed in shape from the oval cross-sectional shape of FIG. 20 to the triangular cross-sectional shape of FIG. 21 with the attendant advantages as discussed above with references to the embodiment of FIG. 8.

As a result of the reshaping of the heater 61, a broad contact surface 64a which engages the plate contact surface 62a is obtained improving the transmission of heat from the heater 61 to the plate 62 and improving the anchoring of the heater to the plate. It will be noted that during the pressing step of the invention, the embedded portions of the wire 63 penetrate the material of the plate 62 and are enclosed by it, as shown also in FIG. 22. At the same time, the insulating material layer 66 is compressed to its optimum density. As mentioned above, the wire may be either wrapped around the heater tube 61 to form a coil or else the tube may be first bent and then an appropriately sized, already formed wire coil may be slid over the tube. From the standpoints of ease of manufacture and cost, the latter method appears to be the most desirable.

Figure 23:
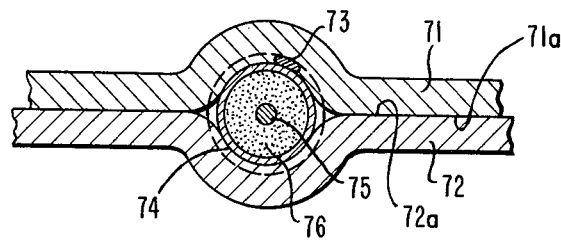
FIG. 23 is a sectional view of another embodiment of the invention for joining two metal sheets together.
Figure 24:
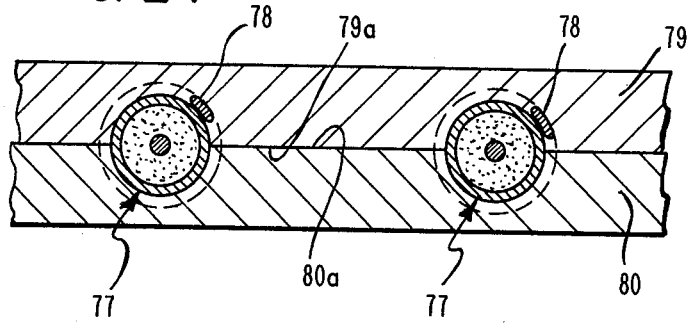
FIG. 24 is a view similar to FIG. 23 of another embodiment of the invention for joining two metal parts together.

FIG. 23 shows the use of the arrangement wherein a wire coil insert is positioned around a tubular heater to join together two metal sheets 71, 72. Coil 73 is positioned around a tubular heater 74 having a core member 75 and insulating material 76 as discussed above with reference to FIG. 19, the material of the wire coil 73 being harder than the material of both of the sheets 71, 72. Thus, when the sheets 72, 72 are compressed together with the coil 73 and the heater 74 therebetween, the contact surfaces 71a, 72a of the sheets 71, 72 are moved into abutting engagement and the wire coil 73 penetrates both of the sheets to firmly anchor the sheets together with the heater therebetween. In the embodiment of FIG. 24, tubular heaters 77 around which an insert in the form of a wire coil 78 is wound in encircling relationship are arranged to join together two metal plates 79, 80. However, in the embodiment of FIG. 24, when the sheets 78, 79 are compressed together with the heaters 76 and coils 77 therebetween, both the coils and the heaters penetrate the material of the sheets 79, 80 with the contact surfaces 79a, 80a moving into abutting engagement.

Figure 18:
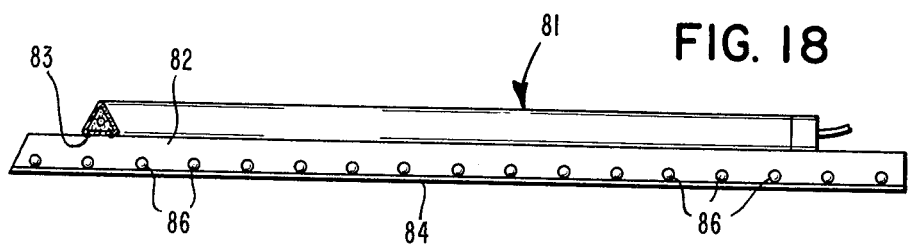
FIG. 18 is an elevation view partially in section of the sole of a flat iron having a portion formed in accordance with the method of the invention.
Figure 19:
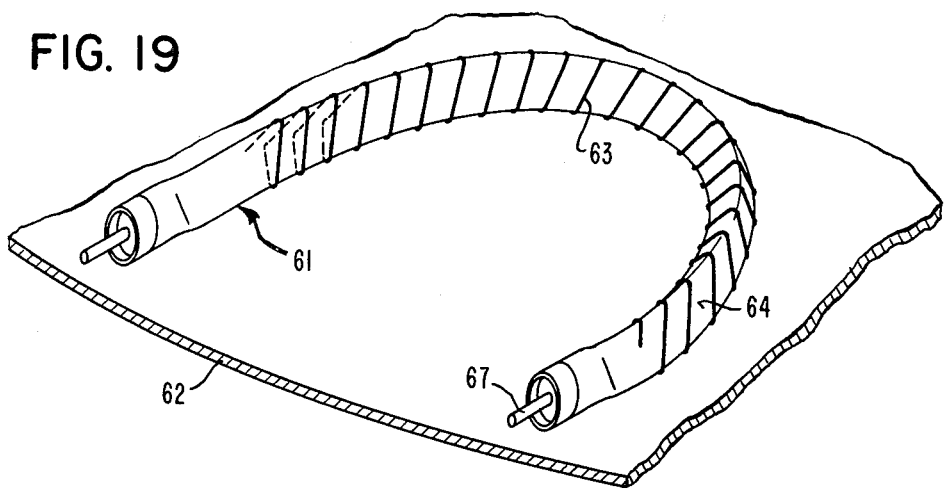
FIG. 19 is a perspective view of metal parts one of which comprises a tubular heater joined together in accordance with another embodiment of the invention.

In FIG. 18, the method of the invention is used to attach a heater 81 of the type described above with reference to FIG. 8 to a sole plate 82 of a flat iron, inserts in the form of wire coils 83 being preferably used with an appropriate die for the heater 81. The plate 82 is formed of a soft material such as aluminum which may be provided with a steel plate 84 secured thereto on the side opposite the heater 81. The plate 84 may be of chrome-nickel steel either formed in a rolling operation on the aluminum body 82 or secured thereto by means of the method of the invention using inserts in the form of spherical balls 86 suitably secured to one surface of the plate 84 by welding or the like.

Figure 25:
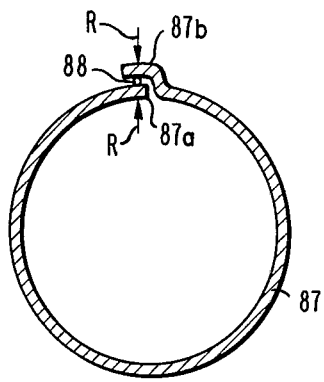
FIG. 25 is a sectional view of a tube formed in accordance with another embodiment of the invention.

The method of the invention may also be employed to form tubular conduits as shown in the embodiments of FIGS. 25–28. In FIG. 25, sheet metal 87 is formed into a circular configuration with marginal edge portions 87a, 87b in overlying relationship with an insert 88 which may be in the form of a wire coil disposed therebetween. Preferably marginal edge portion 87b is suitably shaped as shown and with the method of the invention the edge portions 87a, 87b are moved in the direction of the arrows R into engagement in a compressing operation, the insert 88 penetrating the material of both marginal edge portions 87a, 87b to provide a secure joint thereby forming a conduit for the transmission of fluids or the like.

Figure 26:
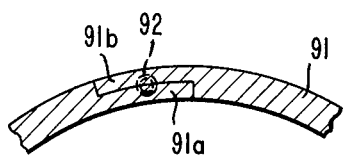
FIG. 26 is an enlarged sectional view of a portion of a modification of the embodiment of FIG. 25.

In the embodiment of FIG. 26, a conduit is also formed but the metal sheet 91, also formed in a circular cross-sectional shape, has its marginal edge portions 91a, 92b, notched for mating engagement so that when the edge portions are compressed together with an insert 92 in the form of a wire coil or the like therebetween, the resulting conduit formed from the sheet 91 is formed with a smooth continuous joint. The embodiment of FIG. 26 is formed from a metal sheet 91, having a relatively thick wall and with the additional advantage that the joint formed therein is inconspicuous.

Figure 27:
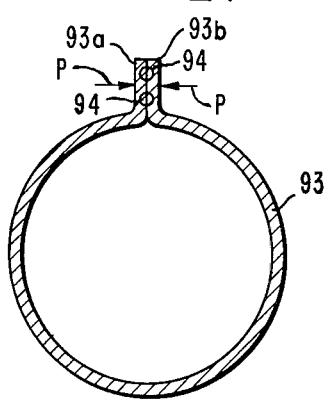
FIG. 27 is a sectional view of still another modification of the embodiment of FIG. 25.

In the embodiment of FIG. 27, wherein a conduit or pipe is also formed, the metal sheet 93 has its marginal edge portions bent to form substantially radially outward projecting flanges 93a, 93b between which inserts such as wire coils 94 are disposed. The flanges 93a, 93b are compressed together in the direction of the arrows P as described above to form a joint in accordance with the method of the invention and the flanges 93a, 93b may be utilized to not only form the pipe but to provide a means for hanging up the pipe.

Figure 28:
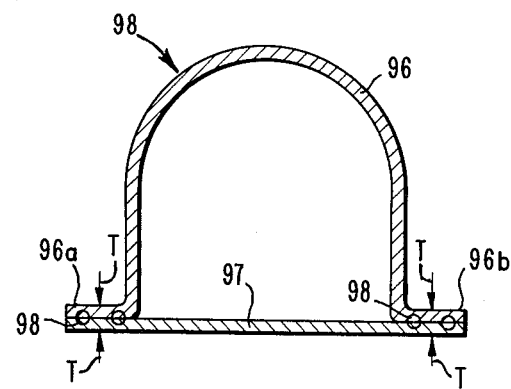
FIG. 28 is a sectional view of a pipe formed in accordance with another modification of the invention.

In the embodiment of FIG. 28, a metal sheet or plate 96 is formed into a U-shaped configuration and provided with a pair of outwardly directed marginal flanges 96a, 96b. A metal plate 97 is joined to the open end of the shaped plate 96 with the marginal edge portions of plate 97 secured to the flanges 96a, 96b, using the method of the invention. Inserts 98 in the form of wire coils or the like are disposed between the flanges 96a, 96b, and the marginal edge portions of plate 97 as described above the parts being compressed together in the direction of the arrows T to form a joint along each side edge of the sheet metal member 96 thereby providing a conduit designated generally by the numeral 98. The conduit 98 may be used to form a conduit system for cooling liquids on a plate 97 of relatively large size.

Figure 29:
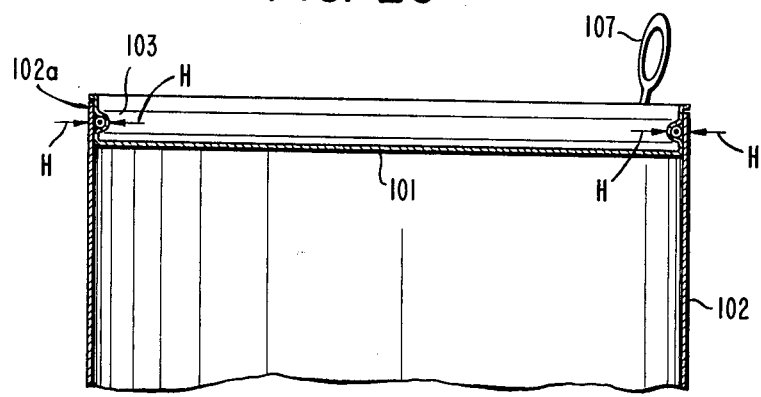
FIG. 29 is a sectional view of the upper portion of a can formed in accordance with another embodiment of the invention.

In the embodiment of FIGS. 29, 30, the method of the invention is utilized to secure a lid 101 in closing relationship with the open end of a metal container 102. The lid 101 is provided with an upstanding annular flange 103 which, in the closing relationship of the lid 101 within the container open end, is disposed adjacent the upper edge portion 102a of the container An annular insert 104 in the form of a wire coil or the like is disposed between the container edge portion 102a and the flange 103. The flange 103 and container upper edge portion 102a are then compressed together in the direction of the arrows H as described in accordance with the method of the invention and as shown in FIG. 30. The wire coil 104 also preferably includes a core member such as rod 106 to which a tear-off grip 107 may be attached, the core member 106 being somewhat longer than the coil 104. Thus, by means of the grip 107, the sealing joint formed as shown in FIG. 30 may be torn apart to permit removal of the lid 101.

FIG. 31 shows an embodiment in which relatively large sheet metal parts may be joined together in sealing relationship such as for roof covers or the like. As shown in FIG. 31, metal panels 107, 108 have adjacent marginal edges bent upwardly to form flanges 107a, 108a respectively which are disposed in abutting engagement. An elongated covering member 109 is provided which is of U-shaped configuration having leg portions 111, 112 is disposed in covering relationship with the flanges 107a, 108a, with inserts inserts 113 disposed between each leg portion 111, 112 and the as-associated flange 107a, 108a. The leg portions 111, 112, the in-inserts 113 and the flanges 107a, 108a are then pressed together in the direction of the arrows K in accordance with the method of the invention so that a joint is formed for securely holding all of the parts together in a bonded relationship. The compressing of the parts together may be accomplished by a pneumatic hand tool which progressively presses together the legs 111, 112 of the covering member 109 in the longitudinal direction of the covering member.

In the embodiment of FIG. 32, there is shown a portion of a conduit system such as evaporator unit 114 for a refrigerator or the like. In the evaporator unit 114, one of two metal plates 116, 117 to be joined is provided with a plurality of trough-like indentations 118 with flat areas 119 therebetween. The flat areas 119 on plate 116 are joined to the other of the plates 117 using inserts such as wire coils 120 in accordance with the method of the invention so that the indentations 118 provide conduits through which refrigerant or the like is circulated.

I claim:

1. A method of cold-joining metal parts together comprising the steps of, providing two metal parts having contact surfaces, providing at least one insert comprising a wire coil having a predetermined pitch in accordance with the material of said metal parts and said wire coil and said wire coil having a hardness greater than the hardness of the metal of both of said metal parts, positioning said insert between said metal parts with oppositely disposed portions of said insert in engagement with the contact surface on said metal parts, moving said metal parts together with said insert therebetween and compressing said metal parts together to cause the metal of said metal parts to flow around the associated portions of said insert for anchoring said insert to said metal parts with said contact surfaces in abutting engagement and with said metal parts in a securely bonded relationship.

2. A method in accordance with claim 1 including a longitudinally extending, metal core member disposed centrally within said wire coil.

3. A method in accordance with claim 2 wherein said core member comprises a wire rod.

4. A method in accordance with claim 3 wherein said core member comprises a substantially flat strip of metal.

5. A method in accordance with claim 2 wherein said wire coil is arranged in the form of a grid having intersecting sections and wherein said core members of said sections are arranged in intersecting relationship.

6. A method in accordance with claim 1 wherein one of said metal parts comprises a tubular heater having a tubular metal casing and wherein the outer surface of said metal casing forms said contact surface.

7. A method in accordance with claim 6 including the step of shaping said tubular heater in a die having a predetermined configuration during said compressing step.

8. A method in accordance with claim 1 wherein one of said metal parts comprises a tubular heater having a tubular metal casing and wherein the outer surface of said casing forms said contact surface.

9. A method in accordance with claim 8 wherein said insert comprises a coil of wire and including a longitudinally metal core member disposed centrally within said wire coil, said wire coil having a predetermined pitch in accordance with the material of said metal parts and wire coil.

10. A method in accordance with claim 6 wherein the other of said metal parts comprises a vessel having a metallic contact surface.

11. A method in accordance with claim 6 wherein said insert comprises a coil of wire, said wire coil being disposed in longitudinally extending, encircling relationship with said tubular heater.

12. A method in accordance with claim 1 wherein said metal parts comprise a pair of metal sheets.

13. A method in accordance with claim 12 wherein said insert comprises a tubular heater having a tubular metal casing and wherein said wire coil is disposed in longitudinally extending encircling relationship with said tubular heater and wherein the oppositely disposed portions of both said wire coil and tubular heater are embedded in said metal sheets during said compressing step.

14. A method in accordance with claim 9 including the step of shaping said tubular heater in a die having a predetermined configuration during said compressing step.

15. A method in accordance with claim 1 wherein at least one of said metal parts is formed of a metal consisting at least in part of aluminum.

16. A method in accordance with claim 8 wherein the other of said metal parts comprises a heat conductive sheet plate and wherein at least one tubular heater is secured to said plate by said compressing step to form a heating appliance for room heating purposes.

17. A method in accordance with claim 11 wherein one of said metal parts comprises a metal container having an open end defined by an upper edge portion and the other of said metal parts comprises a lid for said container having an upstanding marginal flange, said lid being disposed in closing relationship with said container open end with said flange in overlying relationship with said upper edge portion and with said insert therebetween and wherein said flange is securely bonded to said upper edge portion by said compressing step.

18. A method in accordance with claim 17 wherein said wire coil has a longitudinally extending core member disposed centrally therein and including the step of connecting a tear-off grip to said core member for opening said container.

19. A method in accordance with claim 1 wherein one of said metal parts comprises a pair of metal sheets each having an upstanding flange extending along one marginal edge portion and arranged with said flanges in abutting engagement and wherein the other of said parts comprises a metal covering member U-shaped in cross section having a pair of leg portions, said covering member being disposed with said leg portions in overlying relationship with said abutting flanges and with at least one insert sandwiched between said leg portions and the associated flange and wherein said flanges, inserts and said leg portions are securely bonded together by said step of compressing said metal parts together.

20. A method in accordance with claim 12 including the further steps of providing one of said metal sheets with a plurality of elongated, trough-like indentations arranged in uniformly spaced relationship and arranging said wire coil on the portions of said one metal sheet not provided with said indentations to thereby form a plurality of conduits between said metal parts for conducting a heat transfer medium therethrough.

21. The method in accordance with claim 3 wherein said core member comprises a tubular heater.

22. A method of cold-joining metal portions together comprising the steps of, providing a metal sheet having a tubular configuration with longitudinally extending edge portions, arranging said edge portions in adjacent relationship, providing at least one insert of metal having a hardness greater than the hardness of the metal sheet, positioning said insert between said edge portions in sandwiched relationship therewith, and compressing said edge portions together to cause the metal of said edge portions to flow around the associated portions of said insert to secure said edge portions together with said insert therebetween and anchored therein to thereby form said sheet into a tubular conduit.

23. A method in accordance with claim 22 wherein said insert comprises a wire coil, said wire coil having a predetermined pitch in accordance with the material of said metal sheet and said wire coil.

24. A method in accordance with claim 23 including a longitudinally extending metal coil member disposed centrally within said wire coil.

* * * * *